Nov. 17, 1942.                J. F. SULLIVAN                2,302,402
                              WEIGHING SCALE
                         Filed March 20, 1939            9 Sheets-Sheet 1

Inventor
James F. Sullivan
By William Janus Atty.

Nov. 17, 1942.  J. F. SULLIVAN  2,302,402
WEIGHING SCALE
Filed March 20, 1939  9 Sheets-Sheet 7

Inventor
James F. Sullivan
By William Stamus Atty.

Nov. 17, 1942.　　　J. F. SULLIVAN　　　2,302,402
WEIGHING SCALE
Filed March 20, 1939　　9 Sheets-Sheet 9

Inventor
James F. Sullivan
By William James Att.

Patented Nov. 17, 1942

2,302,402

UNITED STATES PATENT OFFICE 2,302,402

WEIGHING SCALE

James F. Sullivan, Columbus, Ohio

Application March 20, 1939, Serial No. 262,809

17 Claims. (Cl. 265—54)

This invention relates to weighing scales and more particularly to weighing scales for weighing or testing connecting rods and the like.

The present application is a continuation in part of a copending application filed by me April 1, 1937, Serial No. 134,243.

In the commercial production of connecting rods for internal combustion engines and Diesel engines, it is important in order to obtain accurate balancing of the engine that all of the connecting rods thereof be of the same weight and that the respective weights of the ends of each connecting rod be the same or within the allowable tolerance zone as the corresponding ends of the other rods of the same unit or engine.

Among the main objects of the invention is the provision of a weighing scale consisting of two units which are operable independently of each other and are enclosed in a housing in spaced-apart relation with each other with the load receiving supports or outriders extending above the front end of said housing and adapted each to receive one end of a connecting rod, there being a weight indicating pointer cooperatively associated with each weighing unit within said housing and a projecting means for projecting the image of each pointer in an enlarged scale onto an indicating chart arranged within said housing and visible through a window in one of the walls thereof.

Other objects of the invention are to provide a cradle or support disposed transversely above the front end of the housing and carried at its ends by the respective load receiving supports of the weighing units, said cradle being provided at each end with a suitable upwardly presented means adapted to receive the predetermined end of a connecting rod to be tested.

Additional objects of the invention are to provide a weighing scale, including a housing, and having a pair of weighing units arranged within said housing parallel with each other and operable independently of each other, said units having their load receiving members arranged in the front end of said housing and extending upwardly thereabove, and having pivotally supported thereon the ends of a suitable cradle which is transversely disposed of said housing and adapted to receive and support a connecting rod to be tested, there being arranged in said housing a projecting means for projecting the image of a pointer of each scale unit onto a weight indicia chart arranged in spaced relation therewith, whereby the weights of both ends of the connecting rod can be simultaneously ascertained by reading said charts, said housing being provided with a window through which said charts are visible.

Another object of the invention is to provide a weighing scale for connecting rods and the like in which the weighing units, including the weight indicating means thereof, are enclosed in a housing so that only the load receiving supports extend outwardly from said housing to receive a cradle or connecting rod support, there being a window provided in said housing through which the weight indicia charts are rendered visible.

Additional objects of the invention are to provide a weighing scale for connecting rods which is compact in size, is highly efficient in performing its intended functions, and in which the weighing units and the respective weight indicating means thereof are wholly contained within the scale housing.

With these and other objects in view, my invention consists in certain novel features of construction and arrangement of parts, hereinafter more fully described and claimed, and illustrated in the accompanying drawings, in which—

Referring by numerals to the accompanying drawings, 10 indicates a base and 11 a housing for the scale. The housing is box-shaped having side walls 11a, a front wall 11b, a rear wall 11c, and a top wall 11d. The side walls 11a are secured to the base 10 by screws 12, or in any other suitable manner. The top wall 11d is formed at its rear end with an opening 13 which is adapted to be closed by a hood or housing extension 14 hinged to the rear wall 11c, as indicated at 15. The rear wall 14a curves upwardly and forwardly from the hinged connection 15 and toward the front wall 14b. This wall 14b is provided preferably in the center with a window or sight opening 16 through which the rear end of the housing is visible. This opening 16 is preferably closed by a pane of transparent glass 17.

Disposed in the housing is a pair of weighing units or scales 18 and 19. These are identical in construction and operation and are arranged parallel with each other with the load receiving ends under the front end of the housing and with the weight receiving ends under the rear or hood end thereof.

The base 10 has fixed or formed integral therewith a plurality of upwardly projecting brackets 20 arranged in pairs and spaced from each other and from the ends of the base. Arranged in the upper end of each bracket is a bearing 21 and operating in these bearings are knife-edge members 22 extending transversely from a scale beam 24. Each scale beam, which is preferably of rectangular frame, has side members 24a and end members 24b and extends longitudinally of the housing. At the front end of each beam the side members 24a are each provided with an upwardly presented and transversely extending knife-edge member 25 on which rest the bearings 26 of a load support or outrider 27. At the rear end of each beam a weight support or outrider 28 is mounted by means of knife-edge members 29 extending transversely from said members 24b and supporting bearings 30 fixed in the side arms of the weight support 28.

Each load support 27 has a centrally and upwardly disposed boss 27a which projects into a circular opening 31 formed in the top wall 11d in front of the hood 14. Engaging said boss 27a is a boss 32 formed on the underside of a load receiving member 34.

Each weight support 28 has a similarly formed boss 35 which receives and supports a weight receiving member 37. Load supports 28 and weight receiving members 37 operate in the chamber formed by hood 14. Preferably each member 37 is provided with an upwardly projecting pin 37a and the weights are in the form of disks 37b, each having a central opening to engage said pin when in position on member 37, thereby preventing accidental displacement of the weight disks from said member. Thus while the load members 34 operate exteriorly of the housing above the front end thereof, the weight members 37 are enclosed and are accessible only upon the raising of the hood.

Extending downwardly and axially from each load support 27 is a vertically disposed rod 38 to the lower end of which is pivotally connected the front end of a check link 39. This link is disposed below and parallel with each scale beam 24 and is fulcrumed at 40 in the same vertical plane with the fulcrums 21 and 22 of said scale beam. The rear end of the check link 39 is pivotally connected to the lower end of a vertically disposed rod 41 extending downwardly and axially from the weight platter support 28. These check links operate in the usual manner and preserve the upright positions of the supports.

Fixed to the rear end member 24b of each scale beam 24 and extending rearwardly therefrom is a flex arm 42 to which are connected, by a suitable fastening device 44, the inner ends 45 of a pair of flex members 46. These members are disposed one above and one below the flex arm in a vertical plane therewith and they extend rearwardly and curve upwardly in the case of the upright member and downwardly in the case of the lower member with their outer ends 47 extending forwardly parallel with the inner ends 45 and connected by fastening devices 48 to the corresponding ends of a bracket 49. These ends of brackets 49 are disposed above and below flex arms 42 in spaced relation therewith. Each bracket 49 is fixed by screws 50 to an extension 51 formed integral with the base 10 and extending upwardly therefrom.

An inverted U-shaped member 52 of substantial width extends on the sides and over the top of said flex members 46 and bracket 49. The top of this member is flat and forms a support for a plurality of weights 37b. This top is preferably provided with an upwardly projecting pin 54 for engaging the holes in said disks or weights 37b. Thus the member 52 forms a keeper for additional weights and also acts as a guard or cover for the flex members 46.

Each flex arm 42 is preferably adjustably mounted in the rear end member 24b and is secured in adjusted position by a set screw 55.

Fixed to each end member 24b in spaced relation with the flex arm 42 is a longitudinally extending rod 56. This rod is preferably screw-seated in said rear end member 24b and is locked in place by a lock nut 57. The outer end of this rod has pivotally connected thereto the upper end of a piston rod 58 operating in a dashpot 59. The latter is mounted on base 10 near the rear end thereof. A balance weight 60 is screw-seated on the screw-threaded shank of rod 56 and is adjustable thereon to obtain accurate balanced condition of the scale beam 24.

A bumper 61 is screw-seated in a boss 62 extending from base 10. This bumper is engageable by the rear end member 24b of the corresponding scale beam and limits the downward movement of said end 24b. The bumper is adjustable in the boss 62 in a vertical plane and is locked in adjusted position by a lock nut 64. The bumper 61 is provided with a rubber cap 65 which forms a cushion for the rear end 24b and prevents jarring of the scale beam.

A pair of bumpers 69 is arranged under the side members 24a near the front end member 24b of each scale beam. These bumpers are similar in construction and operation to bumpers 61. The base 10 is provided with rubber feet 70 and the end walls 11b and 11c are each provided with a handle 71.

Figure 1:
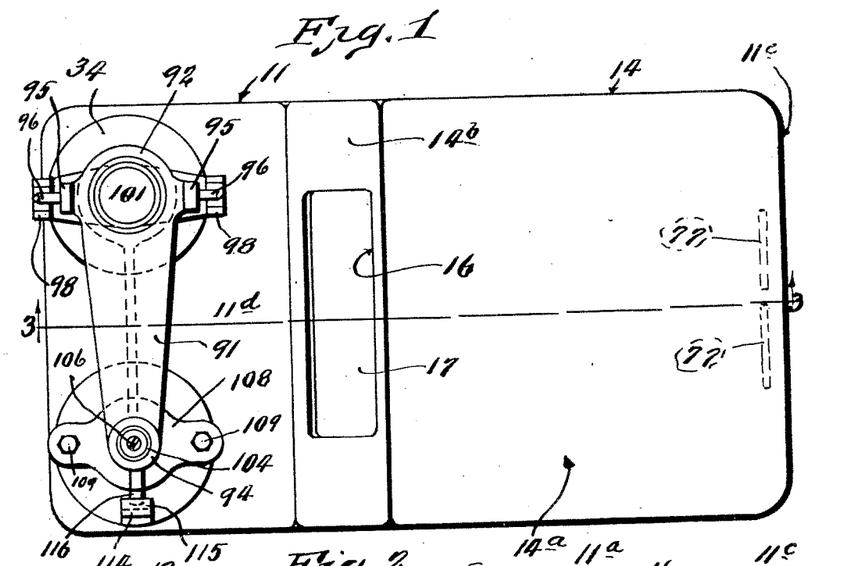
Figure 1 is a top plan view of my weighing scale.
Figure 2:
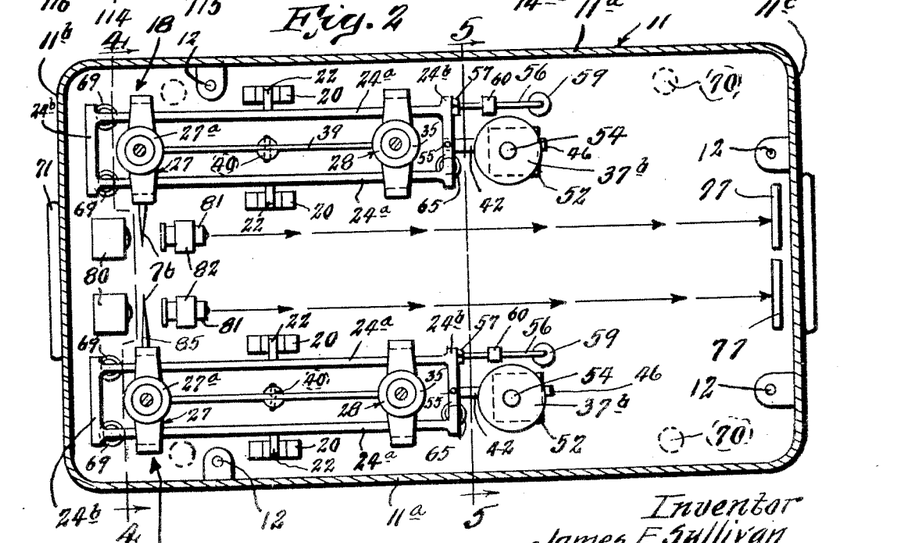
Figure 2 is a horizontal cross section through the same.
Figure 3:
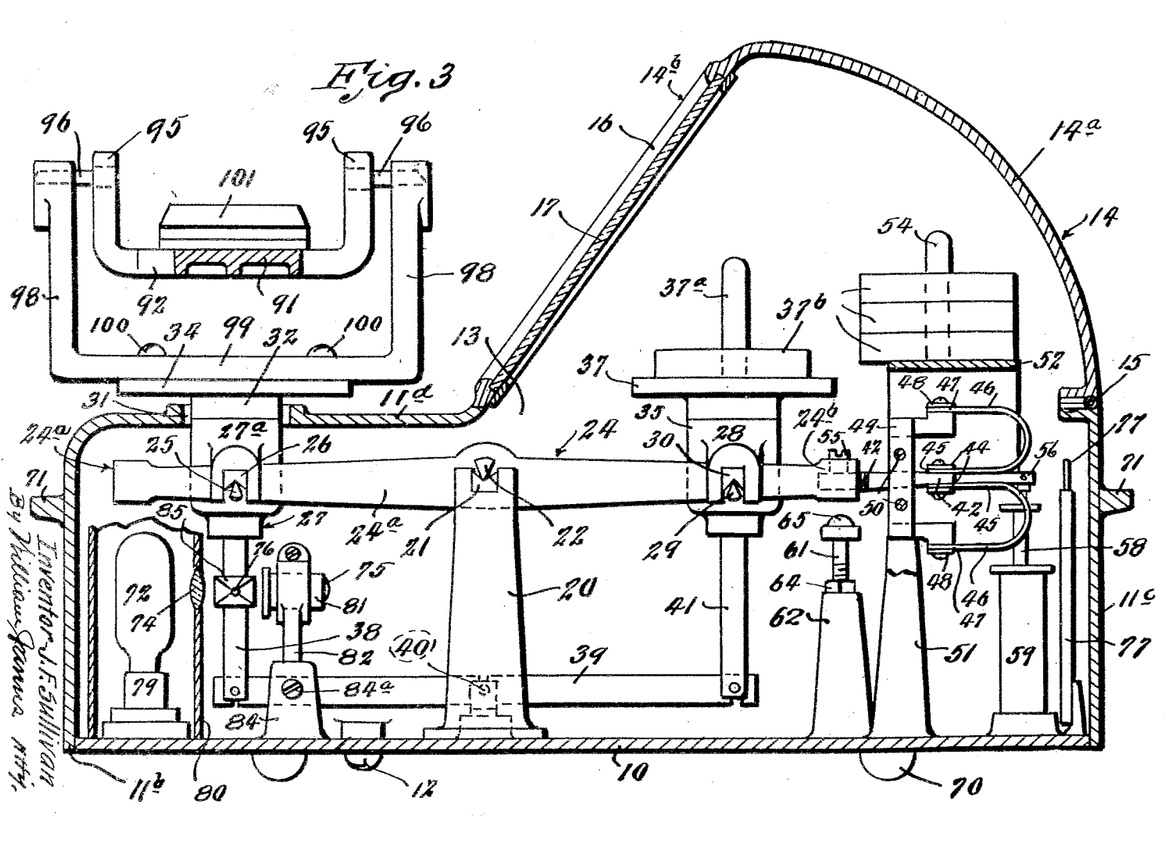
Figure 3 is an enlarged vertical cross section taken on line 3—3 of Figure 1.
Figure 4:
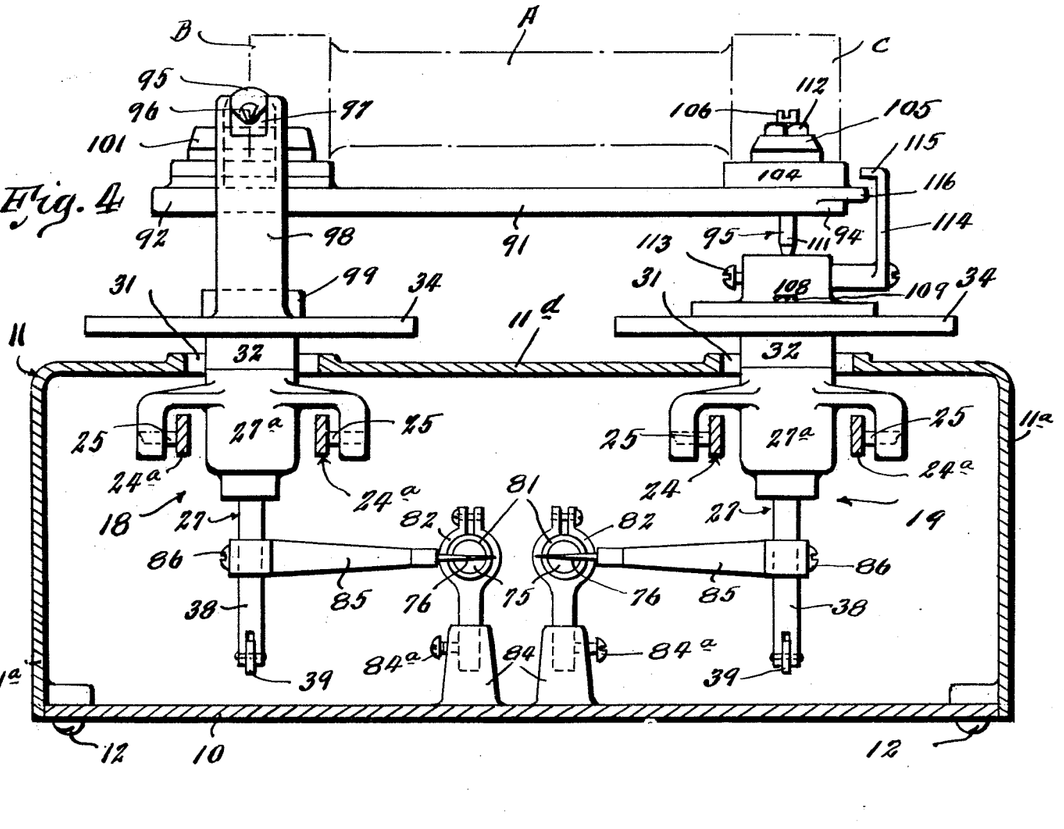
Figure 4 is an enlarged transverse cross section taken on line 4—4 of Figure 2.
Figure 10:
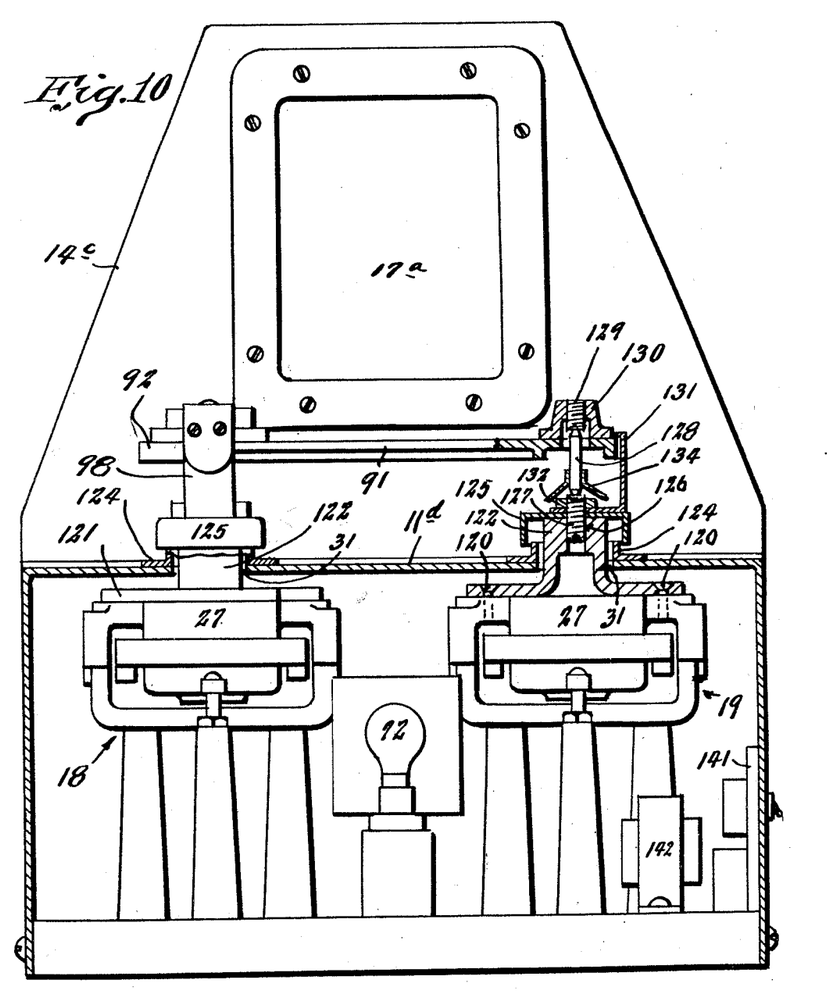
Figure 10 is a front elevation, partly in cross section, of another form of my scale.
Figures 11, 13:
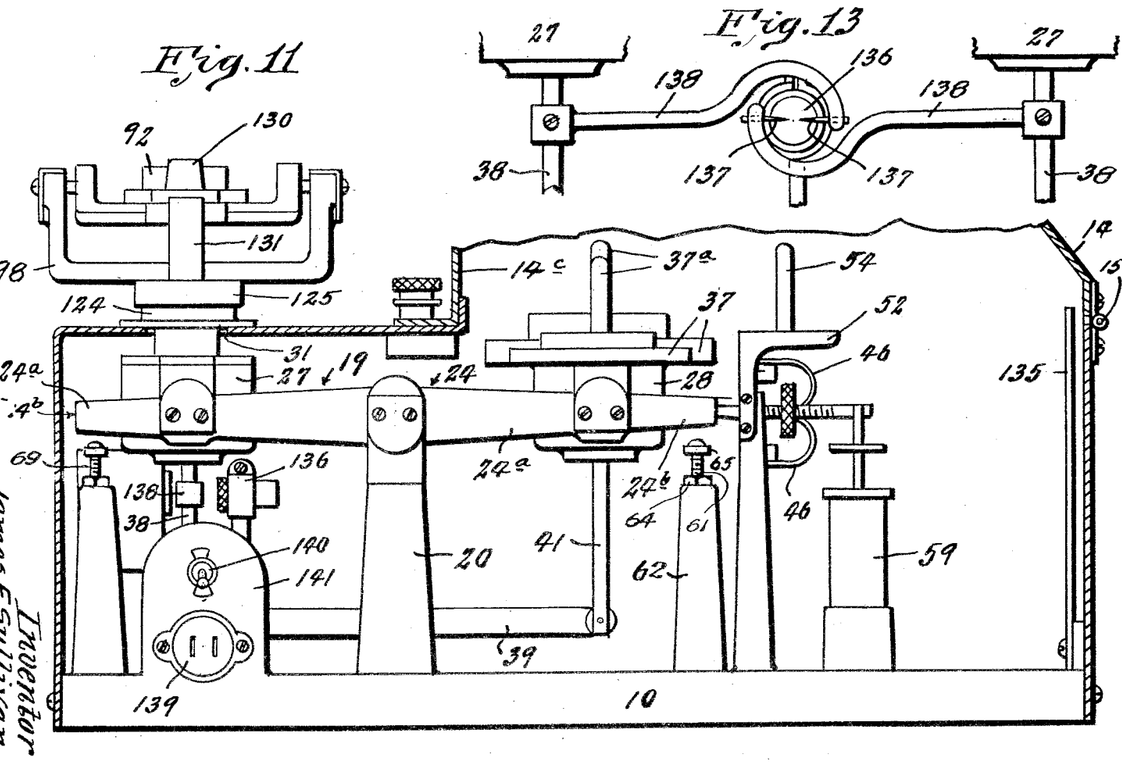
Figure 11 is a side elevation of the scale with the housing in cross section.
Figure 13 shows a modified form of indicator.
Figure 12:
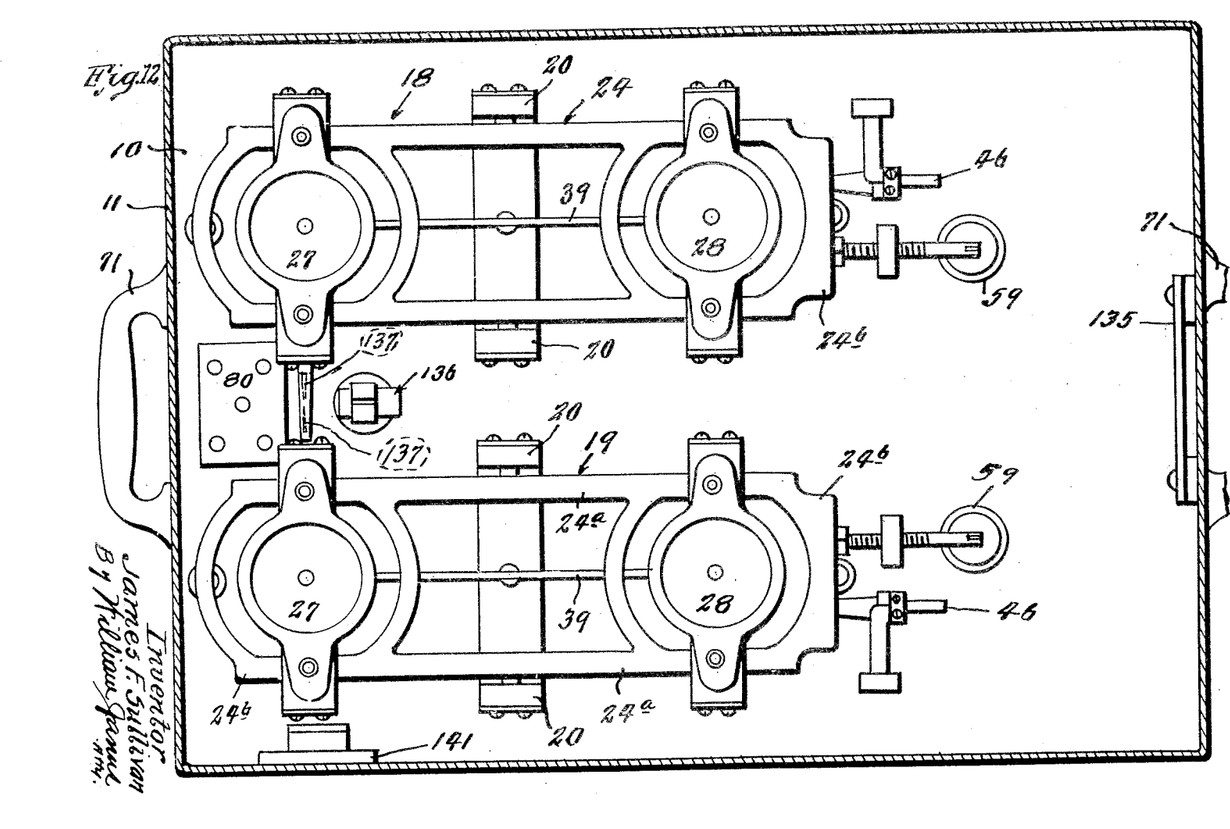
Figure 12 is a top plan view of the scale with the housing shown in section.

A weight indicating means is arranged in the housing to one side of the scale beam, in the present instance, between said scale beams. A separate weight indicating means can be used for each scale beam, as shown in Figures 2 and 4, or a single indicating means can be used to project the pointers simultaneously onto a single chart member, as shown in Figures 10 to 12 in a vertical plane with the window or opening 16. Each weight indicating means comprises a source of light 72, a condenser lens 74, a pair of projecting lenses 75, a pointer 76 disposed between said lenses 74 and 75, and a stationary member or screen 77 provided with a chart having suitable weight indicia 78.

The source of light 72 is in the form of an electric lamp mounted in a socket 79 fixed on base 10. A housing 80 encloses each lamp and socket and has an opening in which is disposed a condensing lens 74. The projecting lens or lenses are mounted in a horizontally disposed cylinder 81 which is carried by the upper split end of a mounting 82. The lower end of this mounting is adjustably received in a boss 84 projecting upwardly from base 10 and is held in adjusted position by a set screw 84a.

Each pointer or indicating needle 76 is disposed horizontally and intersects the optical axis of the lenses 74 and 75. This pointer is carried by the outer end of an indicator arm 85, the inner end of which is adjustably mounted on the rod 38 of each load platter support 27 and is secured in position on said rod by a set screw 86.

Each arm 85 is horizontally disposed and extends transversely of the front end of the scale beam toward the other scale beam. Each arm 85 and pointer 76 are movable in a vertical plane transversely of the optical axis of the projecting means in accordance with the weighing movement of the corresponding scale beam. The shadow or image of each pointer 76 is projected or thrown onto the respective chart into correlation with the weight indicia 78 corresponding to the weighing movement of the scale beam. Where the scale is used as an even balance scale, as in the instant case, the weight indicia of each chart are arranged to indicate balanced condition and over and under weight.

Figures 7, 8, 9:
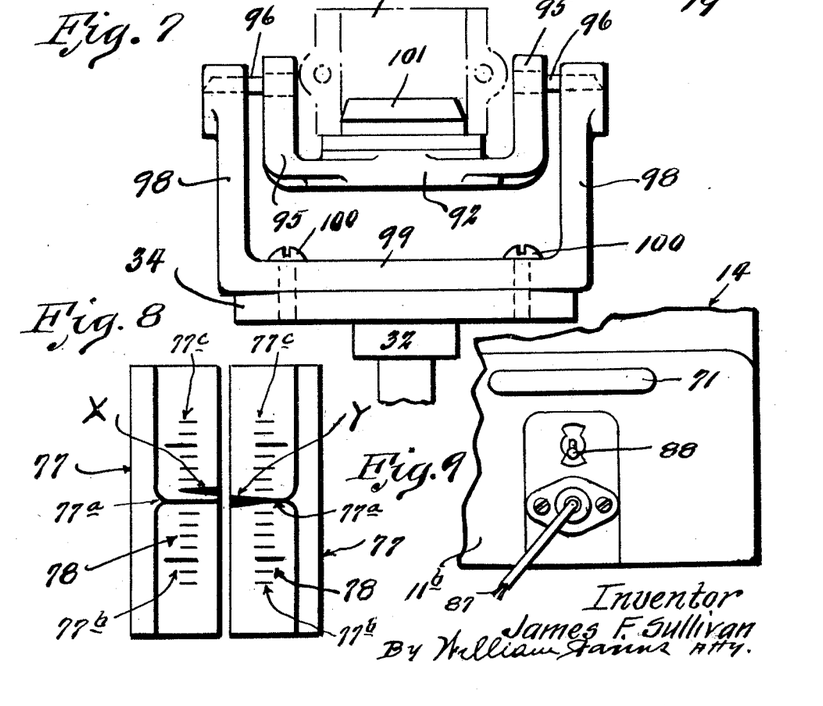
Figure 7 is an enlarged end elevational view of one end of the cradle.
Figure 8 is a front elevational view of the weight indicia charts used in the scale.
Figure 9 is an enlarged fragmental front elevation of the scale.

The lamp 72 is supplied with electric current by wire connections 87 connected to the socket 79 and adapted to be plugged into a suitable supply circuit (see Fig. 9). A manually operable switch 88 is arranged in one of the walls of the housing 11 for opening and closing the lamp circuit.

Figure 14:
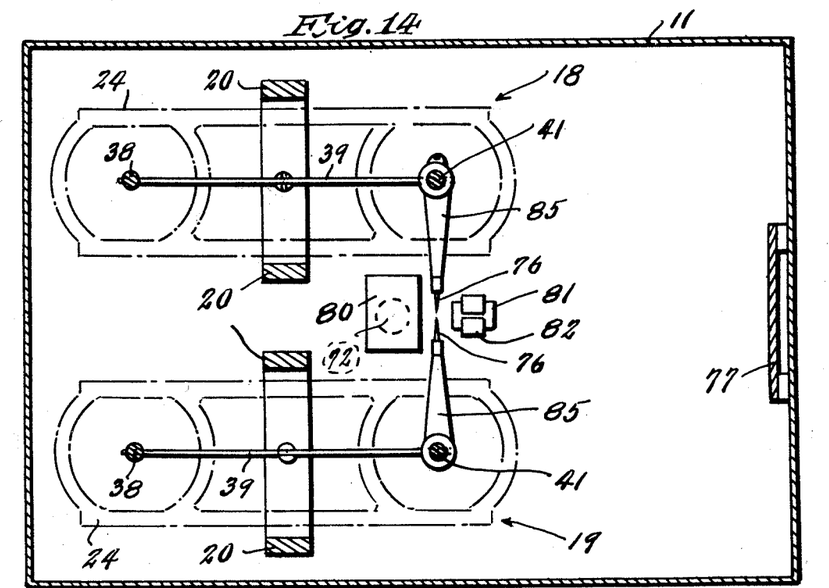
Figure 14 shows an indicator mounted on the weight support.
Figure 15:
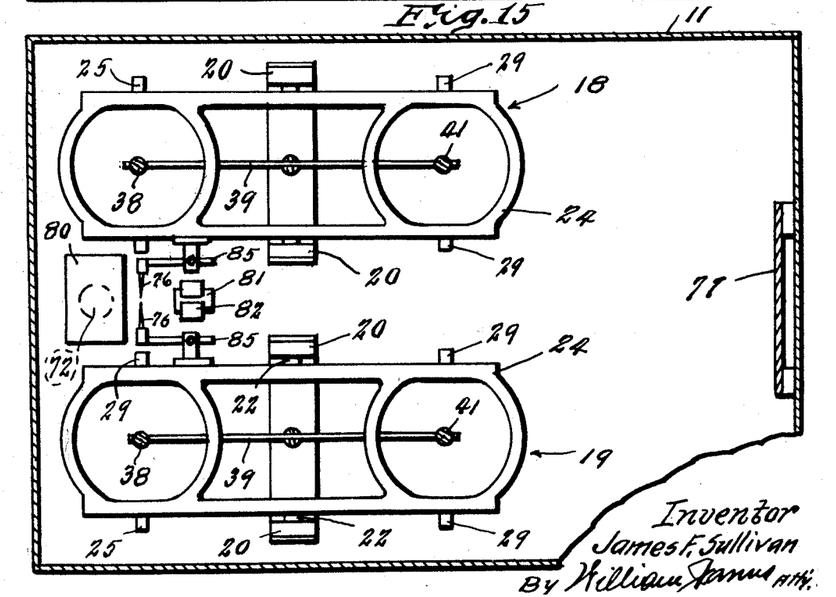
Figure 15 shows the indicator mounted on the scale beam.

While the indicator arm 85 is shown as being carried by the load support 27, it can be attached to the weight support 28, as shown in Figure 14, or to any other movable part of the scale, such as the scale beam 24 wherein a member 38a is fixed to and extends downwardly from the beam and receives the pointer arm 85.

By arranging the scale so that the load support ends are disposed nearest to the operator and the weight support ends farthest from him, I utilize the length of the scale beams and of the housing for the projection of the shadows or images of the pointers onto the respective charts, thereby obtaining the desired magnification of the movement of the pointers without the use of extensions or towers on the housing. This arrangement not only improves the appearance of the scale but also provides for a more compact construction thereof. The location of the weight indicating means within the housing protects it against injury and tampering. It also simplifies the construction and insures more efficient operation as the pointers are mounted directly on movable parts of the scales and no operating connections are required.

Figure 5:
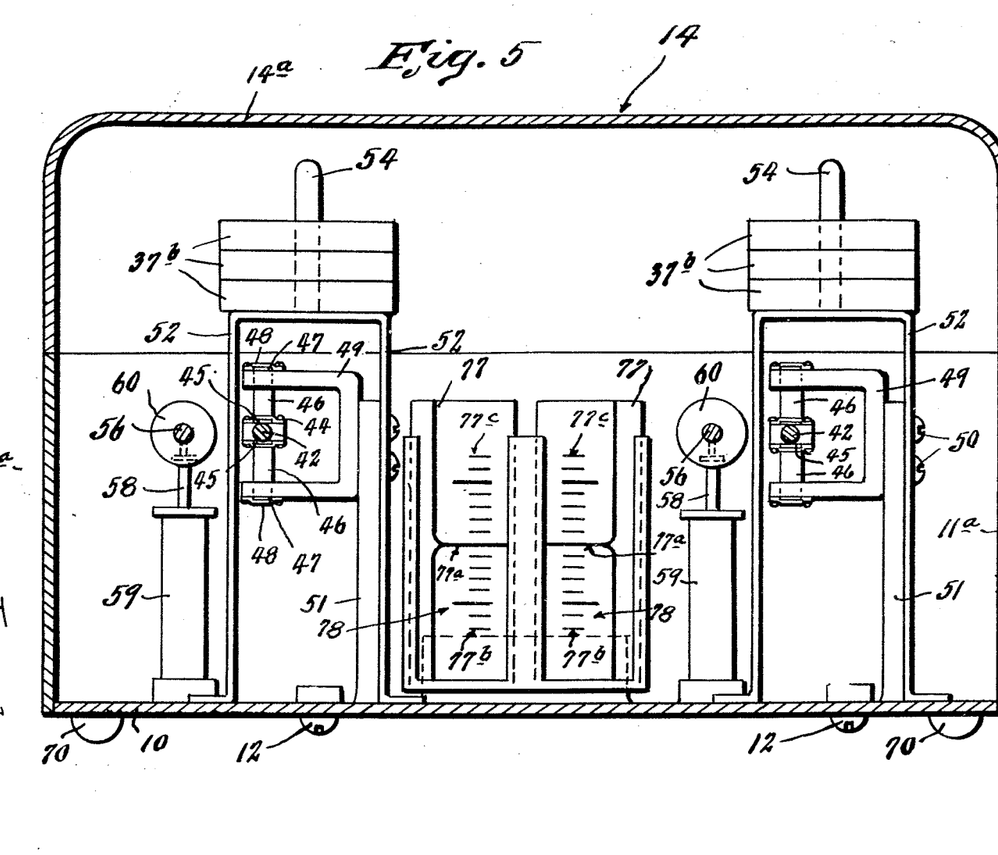
Figure 5 is an enlarged transverse vertical cross section taken on line 5—5 of Figure 2.

Each weight indicia chart 77 (Figure 5) is provided with a central or even-balance mark 77a and a plurality of marks 77b disposed below said mark 77a and indicating, preferably in fractions of ounces or grams, overweight, and a plurality of marks or weight indicia 77c disposed above said even-balance marks 77a, and indicating, preferably in fractions of ounces or grams, underweight.

A connecting rod A (Fig. 4) to be tested is placed in position with its ends B and C supported on the load members or outriders 27 by means of a cradle member 91 which extends between said outriders or platters. This cradle has one end 92, which receives the large end B of the rod, pivotally mounted on one member or outrider 27, while the other end 94 of said cradle which receives the small end C of the rod is pivotally supported by a single point bearing 95 on the other member or outrider 27.

The upper face of member 91 is flat and tapers toward the end 94 to conform with the general shape of the connecting rod. The ends of this member 91 are pivotally mounted on the members or outriders 27 in order to permit angular disposition of said cradle member with respect to the horizontal plane when weighing the connecting rods and when the two scales have differential weighing movement with respect to each other.

Figure 6:
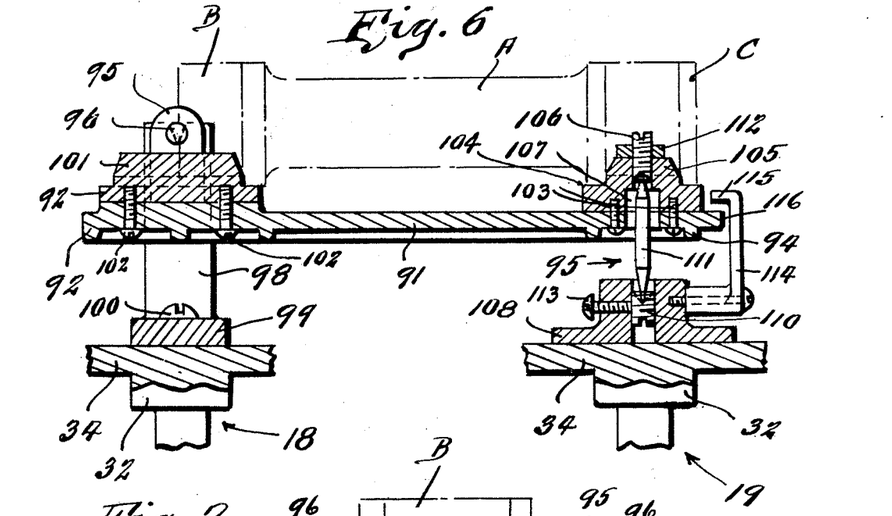
Figure 6 is an enlarged vertical cross section taken through the load receiving supports and parts carried thereby.

The end 92 is formed with laterally and vertically extending arms 95 in each of which is arranged a horizontally and laterally extending knife-edge member 96. Members 96 are presented downwardly and have bearings in blocks 97 carried by the upper ends of arms 98 of a member 99. This member is fixed to one of the members or outriders 27 by screws 100 and arms 98 extend upwardly in spaced relation with the arms 95. A locating pin or rod pilot 101 having a tapered upper end is fixed to end 92 by screws 102 (Fig. 6) and is adapted to receive and center the large end B of rod A.

The end 94 has fixed thereon by screws 103 a rod pilot 104. This pilot has a tapered upper end 105 provided with an axially disposed aperture which is screw-threaded to receive a cup bearing screw 106. Said end 94 and the lower end of the rod pilot 104 are provided with an enlarged aperture 107.

An extension cap 108 is fixed to said outrider or member 27 by screws 109. This extension cap has an axial aperture which is screw-threaded and receives an upwardly presented cup bearing 110. A vertically disposed point bearing rod 111 has its upper end engaging the upper cup bearing 106 and its lower end resting in the lower cup bearing 110, thereby forming a point bearing for the end 94 of cradle 91. A lock nut 112 is used to lock cup bearing 106 in position and a set screw 113 is used to lock the cup bearing 110 in adjusted position. A retainer 114 is fixed to extension cap 108 and extends upwardly and has its upper end 115 disposed laterally to overhang an extension 116 formed on the end 94. This lip 115 limits the upward movement of the end 94 relatively to the extension cap 108 and prevents the unseating of the bearing member 111 from its respective cup bearings.

Before the weighing operation, each scale 18 and 19 with the cradle 91 in place is brought into balance. Weights are used to eliminate the necessity of a master rod. The scale is balanced before the weights are applied.

As each rod is placed on cradle 91 the respective scales 18 and 19 will be operated independently of each other and in accordance with the weights of the respective ends of the rod. The pointers 76 will be projected on the respective charts 77 to indicate whether the ends of said rod are within the limits of a predetermined weighing zone or whether they are over or under the predetermined weight, as indicated at X and Y in Figure 8.

The pilot members or locating pins 101 and 104 not only serve to locate the connecting rods properly on cradle 91 but also prevent the placing of a rod in a reverse position, that is, with the large end on scale 18 and the small end on scale 19. This method of weighing or inspecting rods is accurate and quick and is easily adaptable for weighing various other articles and machine parts.

The cradle or rod holder 91 is supported at three points, namely, the pair of knife-edge members 96 and the point bearing member 111. The members 96 provide a two-point suspension support for the large end 92 of the cradle and member 111 provides a single point support for the small end 94.

This arrangement reduces friction to a minimum and permits said cradle to move with ease from its horizontal plane to an inclined position as and when required by the differential weighing movements of the two scales 18 and 19. Thus the separate weights of both ends of the rod can be obtained simultaneously and with great accuracy.

The form shown in Figures 10 to 12 inclusive is substantially of the same construction as the preceding form except for several changes in the structural details. The front wall 14c of the hood and the glass panel 17a are disposed in a vertical plane to eliminate light reflection from said panel.

Load receiving platters are eliminated from the cradle supports and a special construction is provided which prevents collection of dust and metal cuttings on the exposed supports and excludes dust and metal particles from the interior of the housing.

Fixed to each outrider or load support 27 by screws 120 is a cradle support 121. Each of these cradle supports has a boss or extension 122 which projects upwardly and outwardly through the respective openings 31 formed in the top wall 11d of the housing. A dust ring 124 is fixed to top wall 11d concentric with each opening 31. This ring projects upwardly and has a telescoping relation with a dust cap 125 which is fixed to the upper end of each boss 122 and extends downwardly over said ring. In this manner dust and small particles of metal are prevented from entering the housing through said openings 31.

The elimination of platters prevents accumulation of dust and metal particles thereon which would affect the balance of the scale.

Fixed to one of the bosses 122 is the cradle arm 98 which supports the arm 92 of cradle 91. The other boss 122 is formed with a screw threaded bore 126 for receiving a screw 127. The upper end of this screw is dished out to form a cup bearing for the lower pointed end of a vertically disposed shaft or rod 128. The upper end of this rod extends upwardly through an aperture in one end of the cradle and has a bearing in the lower cup-shaped end of a screw 129. The latter is screw-seated in pilot 130 of said cradle and is designed to receive the small end of a connecting rod to be tested. To hold this cradle shaft or rod 128 in position a retainer 131 is used. This retainer is fixed at its lower end on top of the dust cap 125 by a nut 132 which is screw-seated on screw 127. The upper end of this retainer overhangs the end of the cradle and limits the upward movement thereof.

A dust shield 134 is fixed to shaft 128 near the lower end thereof and overhangs the cup-shaped bearing screw 127 to protect it from dust. In this manner the interior of the housing as well as the cup bearing of screw 127 are protected against dust and metal particles and the exposed surfaces of the cradle supports are reduced to a minimum to prevent accumulation of loose material thereon.

In the modified form shown in Figure 12, the two weight indicia charts are mounted on a single member 135 and a single projecting means 136 is used for both pointers 137.

Each arm 138 has its outer end carrying pointer 137 curved outwardly so as to dispose the pointer 137 on the opposite side of the optical axis with respect to the weight unit with which said arm is associated. During the projection, the image of the pointer is located on the chart member 135 on the side of its respective scale or unit. The arm 138 is curved outwardly in order to prevent said arm from intersecting the axis of the projecting means. This arrangement permits the weighing scales or units to be placed close together to accommodate comparatively short connecting rods.

An electric socket 139 and a switch 140 (Fig. 11) are mounted in an extension 141 formed integral with one side of the base of the housing and a transformer 142 (Fig. 10) is placed on said base close thereto.

The weighing mechanism is completely enclosed and only the load supports are projected from the housing. Easy access can be had to the mechanism to make the necessary adjustments. The distance between each pointer and the weight indicia chart thereof is such that a proper magnification of the movement of the pointer can be had and the chart can be read easily and accurately. The cradle 91 is supported at three points, namely, the two knife bearings suspending the large end 92 of the cradle and the single point bearing arranged at the small end 94. Thus the cradle can readily adjust itself to the movement of the scale and the friction is reduced to a minimum.

While I have described and illustrated herein the preferred embodiment of my invention, it is obvious that changes in the arrangement and construction of my device can be made without departing from the spirit of the invention.

I claim:

1. In a weighing scale of the class described, the combination of a housing having a window in one of its walls, a pair of scale beams arranged in said housing with their fulcrums in coaxial alignment and with the load receiving ends disposed in spaced-apart relation in the front end of said housing and extending outwardly therefrom, a cradle extending between said scale beams and carried at its ends by said load receiving ends and adapted to receive and support a connecting rod whereby each end of said rod is weighed by the respective scale beam, a pointer fixed to a movable part of each scale beam to one side of the fulcrum thereof and extending horizontally and transversely therefrom, a stationary weight indicia chart disposed in said housing in spaced relation with said pointers and said window, and a projecting means in said housing and including a source of light arranged in correlation with said pointers for projecting the images thereof onto the chart to indicate the weights of the respective ends of said connecting rod.

2. In a weighing scale of the class described, the combination of a housing having a window in one of its walls, a pair of scale beams arranged in said housing with their load receiving ends disposed in the front end thereof, a vertically disposed support pivotally carried by each load receiving end, and extending outwardly above said housing, a cradle extending horizontally between said projecting supports, means for pivotally supporting each end of said cradle on the projecting end of the respective support, whereby each end of a connecting rod is weighed by the respective scale beam, a pointer fixed to a movable part of each scale beam to one side of the fulcrum thereof and extending horizontally and transversely therefrom for movement in a vertical plane at a right angle thereto, a stationary weight indicia chart disposed in said housing in spaced relation with said pointers and said window, and a projecting means including a source of light arranged in said housing in correlation with said pointers for projecting the images thereof onto said chart to indicate the weights of the respective ends of said connecting rod.

3. In a weighing scale of the class described, the combination of a housing including a top wall having a flat front portion and having a hood at its rear portion, there being a window formed in the front wall of said hood, a pair of scale beams operatively mounted in said housing longitudinally thereof with their load receiving ends disposed in the front end of said housing with their fulcrums in coaxial alignment with each other, a load receiving support pivotally carried by the forward end of each scale beam and extending upwardly above the flat portion of said top wall, a cradle disposed transversely above said top wall and supported by said supports and adapted to receive at each end a predetermined end of a connecting rod, a pointer fixed to each support within said housing and extending transversely and horizontally therefrom and movable in a plane at right angle to the plane of movement of its respective scale beam, a pair of weight indicia charts arranged within said housing near the rear wall thereof and visible through said window, each chart being provided with indicia to indicate correct weight and over and under weight, and a projecting means in said housing including a source of light for projecting the images of said pointers onto the corresponding charts.

4. In a weighing scale of the class described, the combination of a housing including a top wall having a flat front end and an upwardly extending hood at its rear end, there being a window formed in the front wall of said hood, a pair of scale beams arranged longitudinally of said housing and parallel with each other and with their fulcrums in coaxial alignment, a load receiving support carried by the forward end of each scale beam and extending upwardly above the flat portion of said top wall, a cradle disposed transversely of said scale beams above the front end of said housing, means for supporting each end of said cradle on the respective support, said cradle being adapted to receive at each end a predetermined end of a connecting rod, a movable member operatively associated with each scale beam at one side of the fulcrum thereof and movable in said housing in a plane at right angle to the plane of movement of its respective beam, a stationary weight indicating member arranged in said housing and visible through said window, and a projecting means, including a source of light, arranged in said housing for projecting an image of each of said movable members onto said stationary member for indicating the weight of the corresponding end of said connecting rod.

5. In a weighing scale of the class described, the combination of a housing having a window in one of its walls, a pair of scale beams mounted in said housing longitudinally thereof and with their fulcrums in coaxial alignment, a load receiving support pivotally carried by the forward end of each scale beam and extending upwardly above the front end of said housing, a cradle disposed transversely above said supports, means on each support for pivotally supporting the respective end of said cradle, said cradle being adapted to receive a connecting rod whereby each end thereof is weighed by the respective scale beam, a movable weight indicating member fixed to each support and extending transversely thereof and movable in a plane at right angle to the plane of movement of its respective scale beam, a fixed weight indicating member arranged in the rear end of said housing in optical alignment with the corresponding movable weight indicating member and said window, and projecting means in said housing and including a source of light for projecting each movable weight indicating member onto said stationary weight indicating member to indicate the weight of the corresponding end of said connecting rod.

6. In a weighing scale of the class described, the combination of a housing having its rear end provided with a hood, the front wall of which is formed with a window, a pair of scale beams arranged in parallel relation with each other in said housing with their fulcrums in coaxial alignment with each other and with their load receiving ends disposed in the front end of said housing, a support carried by each load receiving end of said scale beam and extending upwardly and outwardly from the front end of said housing, a cradle disposed transversely above the front end of said housing in parallelism with the fulcrums of said scale beams and pivotally mounted at its ends on the respective supports, said cradle being adapted to receive a connecting rod, a weight indicating member fixed to each support within said housing and extending transversely and horizontally of the respective scale beam for movement in a plane at a right angle thereto, a pair of stationary weight indicating charts arranged in said housing in focal alignment with the respective movable weight indicating members and with said window, and projecting means including a source of light arranged in the front end of said housing and adapted to project the images of said movable weight indicating members onto the respective stationary weight indicating charts.

7. In a weighing scale of the class described, the combination of a housing having its rear end provided with a hood, the front wall of which is formed with a window, a pair of scale beams arranged in parallel relation with each other in said housing with their fulcrums in coaxial alignment with each other and with their load receiving ends disposed in the front end of said housing, a support carried by the load receiving end of each scale beam and extending upwardly and outwardly through the front end of said housing, a cradle disposed transversely of said scale beams above said housing, means for pivotally supporting each end of said cradle on the respective support, said cradle being adapted to receive a connecting rod, a pointer fixed to each support within said housing and extending transversely and horizontally of the respective scale beam for movement in a plane at a right angle to the movement thereof, a pair of stationary weight indicia charts arranged in said housing in alignment with the corresponding pointers and with said window, and projecting means in said housing and including a source of light for projecting the images of said pointers onto the respective charts.

8. In a weighing scale of the class described, the combination of a housing having its rear end provided with a hood, the front wall of which is formed with a window, a pair of scale beams arranged in parallel relation with each other in said housing with their fulcrums coaxially aligned with each other and with their load receiving ends disposed in the front end of said housing, a support carried by the load receiving end of each scale beam and extending upwardly and outwardly of the front end of said scale housing, a cradle disposed transversely of said scale beams above the front end of said housing and pivotally mounted at its ends on the respective supports, an upwardly projecting pilot member fixed on each end of said cradle for receiving and centering a predetermined end of a connecting rod to be weighed, and a weight indicating member in said housing operatively associated with each scale beam near one end thereof and means fixed to each support within said housing and extending transversely of the respective scale beam for movement below the plane of said scale beam and at a right angle thereto, each weight indicating member being movable in accordance with the load placed on the respective scale beam, a pair of stationary weight indicating members arranged in said housing in alignment with the respective movable weight indicating members and with said window, and projecting means in said housing including a source of light arranged adjacent to each of said movable weight indicating members for projecting the images thereof onto said stationary weight indicating members.

9. In a scale for testing connecting rods, the combination of a housing provided at its rear end with an upward extension having a window in its front wall, a pair of scale beams mounted in spaced relation with each other in said housing with their fulcrums coaxially aligned with each other and with their load receiving ends disposed in the front end of said housing, a support mounted on each load receiving end and extending upwardly and outwardly above the front end of said housing, a cradle disposed transversely of said scale beams and extending between the projecting ends of said supports and pivotally supported at its ends thereon, means at each end of said cradle for receiving and supporting the selected end of a connecting rod, a pointer operatively associated with each scale beam near one end thereof and extending transversely and horizontally therefrom for movement at a right angle to the plane of movement of said scale beam, a pair of weight indicia charts fixed to the rear end of said housing in alignment with the window and the corresponding pointers, and projecting means in said housing including a source of light for projecting the images of said pointers onto the respective charts.

10. In a weighing scale for connecting rods, the combination of a housing having a hood at its rear end, the front wall of which is provided with a window, a pair of scale beams mounted in said housing in spaced relation with each other with their fulcrums in coaxial alignment, the load receiving ends of said scale beams being disposed in the front end of said housing, a support carried by said load receiving end of each scale beam and extending upwardly and outwardly from the front end of said housing, a cradle disposed between said supports transversely of said housing and parallel with said fulcrums, means for pivotally supporting each end of said cradle on the corresponding support, a pilot member on each end of said cradle for receiving and spacing one end of a connecting rod, a weight indicia member operatively associated with each scale beam near one end thereof and extending transversely and horizontally thereof substantially coaxially with the other weight indicia member and movable in accordance with the weight of the respective end of said connecting rod, a pair of stationary weight indicating members fixed in the rear end of said housing in alignment with the respective movable weight indicia members, said stationary weight indicia members being visible through said window, and projecting means in said housing including a source of light for projecting the images of the movable weight indicia members onto said stationary weight indicating members.

11. In a device of the class described, the combination with a pair of scale beams, of a cradle extending between the load ends of said scale beams, a pair of knife-edge bearings supporting one end of said cradle from the load end of one of said scale beams, a cup bearing on the load end of the other beam, a cup bearing on the other end of said cradle, and a vertically disposed rod having pointed ends engaging the respective cup bearings and supporting said other end of said cradle.

12. In a device of the class described, the combination with a pair of scale beams arranged in parallel spaced relation, of a cradle extending between the load ends of said scale beams, and a three-point support for mounting said cradle on the load ends of said scale beams, said support including a pair of bearings between one end of said cradle and the load end of one of said scale beams, and a single-point bearing between the other end of said cradle and the load end of the other beam.

13. In a device of the class described, the combination with a pair of scale beams arranged in parallel spaced relation, of a housing enclosing said scale beams, an outrider carried by the load end of each beam and extending outwardly through said housing, a pair of spaced brackets fixed to one of said outriders, a bearing block in the upper end of each bracket, a cradle, a knife-edge member extending transversely from each side of one end of said cradle and engaging the corresponding bearing blocks, a cup bearing fixed in the upper end of the outrider of the other beam, a cup bearing fixed in the other end of said cradle, and a vertically disposed rod extending between said cups and having its ends pointed and bearing therein.

14. In a device of the class described, the combination with a pair of scale beams arranged in parallel spaced relation, of a housing enclosing said beams, an outrider carried by the load end of each scale and extending outwardly through said housing, a pair of spaced brackets fixed to one of said outriders, a bearing block in the upper end of each bracket, a cradle, a knife-edge member extending transversely from each side of one end of said cradle and engaging the corresponding bearing blocks, a cup bearing fixed in the upper end of the outrider of the other beam, a cup bearing fixed in the other end of said cradle, a vertically disposed rod extending between said cups and having its ends pointed and bearing therein, and a retaining means fixed to the last-mentioned outrider and overhanging the last-mentioned end of said cradle for limiting the upward movement of the latter.

15. In a device of the class described, the combination of a pair of scale beams arranged with their load ends in spaced relation with each other, a cradle extending between said load ends, a pair of brackets fixed to the load end of one of said beams, a pair of bearings arranged each to one side of one end of said cradle and mounted in said brackets, and a single-point bearing supporting the other end of said cradle on the load end of the other one of said beams.

16. In a device of the class described, the combination of a pair of scale beams having their load ends arranged in spaced relation with each other, a housing enclosing said beams, a load support carried by the load end of each of said beams and extending upwardly above the front end of said housing, a cradle disposed transversely of said housing above said load supports, a pair of knife-edge bearings supporting one end of said cradle on one of said supports, a vertically disposed pin having pointed ends, one of which engages the other support and the other end of which engages the other end of said cradle, a pointer carried by the load end of each of said beams, a weight indicating chart member arranged in said housing in spaced relation with said pointers, and a projecting means including a source of light for projecting an image of said pointers onto said chart member in accordance with the weighing movements of the corresponding beams.

17. In a device of the class described, the combination of a pair of scale beams having their load ends arranged in spaced relation with each other; means extending from the load end of one of said beams to the load end of the other one of said beams for supporting an object to be tested, said means including a member supported by the load end of one of said beams by two friction reducing bearings spaced from one another, and a member supported by the load end of the other one of said beams by a single point bearing; and means for positioning the object to be tested in a predetermined position on the first mentioned means.

JAMES F. SULLIVAN.